3,395,182
CARBONYL-o-CARBORANES AND PROCESS
Hansjuergen A. Schroeder, Hamden, Conn., assignor to Olin Mathieson Chemical Corporation, a corporation of Virginia
No Drawing. Filed Jan. 24, 1966, Ser. No. 522,408
6 Claims. (Cl. 260—586)

ABSTRACT OF THE DISCLOSURE

Carbonyl-o-carboranes are prepared by reacting di(alkali metal)-o-carboranes with phosgene. These compounds are useful as fuels and when incorporated with suitable oxidizers yield propellants suitable for rocket power plants and other jet propelled devices.

---

This invention relates to novel carbonyl-o-carboranes and to a method for their preparation. The novel o-carborane compounds of this invention have the formula:

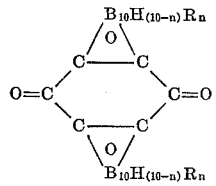

wherein $n$ is an integer of from 0 to 10 inclusive and each R is selected from the group consisting of alkyl of from 1 to 5 carbon atoms, and halogen selected from the group consisting of chlorine, bromine, fluorine and iodine.

Carbonyl-o-carboranes of this invention are prepared by reacting a di(alkali metal)-o-carborane, slurried in an inert solvent, with phosgene at a temperature of from about —10° to about +80° C. and preferably at a temperature of from about 5° to about 40° C. The phosgene can be conveniently added as a solution in an inert solvent, it can be added in liquid or gaseous form to the slurried di(alkali metal)-o-carborane or, if desired, liquid phosgene can be reacted directly to the di(alkali metal)-o-carboranes.

Useful inert solvents include hydrocarbons, such as benzene, toluene, heptane, cyclohexane, etc. Generally, from about 1 to about 2 moles of phosgene will be reacted per mole of the o-carborane compound with the preferred amount being from about 1 to about 1.5 moles per mole of the di(alkali metal)-o-carborane. The time of reaction will vary widely and generally will be from about 0.5 to 5 hours or more depending on the other processing conditions selected.

Ortho carborane (i.e., o-carborane) compounds useful in preparing the di(alkali metal)-o-carboranes of this invention can be prepared by the reaction of decaborane or an alkylated decaborane having an alkyl group containing 1 to 5 carbon atoms with acetylene in the presence of a wide variety of ethers, amines or nitriles. The preparation of these compounds is described in application Ser. No. 741,976, filed June 13, 1958, now abandoned, of Ager, Heying and Mangold. For example, the compound o-carborane, having the formula:

H—C———C—H
\\O/
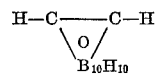

can be prepared by reacting for about 12 hours at 125° C. a mixture of decaborane and tetrahydrofuran in an autoclave pressured to 100 p.s.i. with acetylene. Halogenated o-carborane compounds can be formed by the methods set forth in Heying and Schroeder application Ser. No. 414,947, filed Nov. 27, 1964, and in Schroeder and Smith application Ser. No. 379,859, filed July 2, 1964. For example, B-tetrachloro-o-carborane can be prepared by reacting gaseous chlorine with o-carborane in carbon tetrachloride and under ultraviolet irradiation.

The di(alkali metal)-o-carboranes which are employed in preparing the novel compounds of this invention can be made by the process described in John W. Ager, Jr., U.S. Patent 3,148,219, and have the formula:

M—C———C—M
\\O/
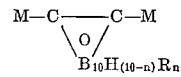

wherein $n$ is an integer of from 0 to 10, R is selected from the group consisting of alkyl of from 1 to 5 carbon atoms and halogen selected from the group consisting of chlorine, bromine, iodine and fluorine, M is an alkali metal selected from the group consisting of sodium, lithium and potassium and with the proviso that when R is alkyl then $n$ is 1. For example, C,C'-dilithio-o-carborane can be formed by reacting o-carborane with n-butyl lithium in the presence of diethyl ether. Useful di(alkali metal)-o-carboranes include C,C'-dilithio-B-methyl-o-carborane, C,C'-dilithio-B-isopropyl-o-carborane, C,C' - dilithio - B-amyl-o-carborane, C,C'-dilithio-B-chloro - o - carborane, C,C'-dilithio-B-fluoro-o-carborane, C,C'-dilithio-B-iodo-o-carborane, C,C'-dilithio-B-tribromo-o-carborane, C,C'-dilithio-B-heptafluoro-o-carborane, C,C'-dilithio - B - decachloro-o-carborane, etc., and the corresponding sodium and potassium compounds.

The novel compounds of this invention are useful as fuels and when incorporated with suitable oxidizers such as ammonium perchlorate, potassium perchlorate, sodium perchlorate, ammonium nitrate, etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse; appreciable increases in performance will result from the use of higher specific impulse materials. The fuels of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter and are mechanically strong enough to withstand ordinary handling.

The boron-containing solid materials produced by practicing the method of this invention can be employed as ingredients of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenolformaydehyde type, the function of the resin being to give the propellant mechanical strength and at the same time improve its burning characteristics. Thus, in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions reference is made to U.S. Patent No. 2,622,277 to Bonnel et al. and U.S. Patent No. 2,646,596 to Thomas et al.

The following example illustrates one embodiment of this invention and is to be considered not limitative.

EXAMPLE I

C,C'-dilithio-o-carborane was prepared from o-carborane (60 g., 0.416 mole) and butyl lithium (1.0 mole) and, after removal of the ether, slurried with 900 ml. toluene. To the mixture was added, with stirring and ice-cooling, a solution of phosgene (120 g., 1.21 moles) in 600 ml. toluene over a 1-hr. period. After the addition was complete, the reaction mixture was kept at 40° C. for 15 min., then filtered, and the filtrate evaporated to dryness. The solid residue was triturated with 200 ml. petroleum ether (B.P. 30–60° C.) to give 41 g. (58 percent) of crude product of the formula:

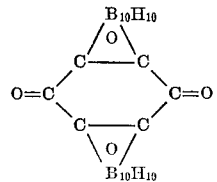

Purification was achieved by recrystallization from carbon tetrachloride. Yield of pure $(o\text{-}B_{10}H_{10}\cdot CO)_2$: 35 g. (49 percent); M.P. 315° C.

*Analysis.*—Calcd. for $C_6H_{20}B_{20}O_2$ (340.6): C, 21.16; H, 5.92; B, 63.53. Found: C, 21.41; H, 5.90, B, 63.27. Mol. weight (in o-dichlorobenzene at 100°), 334.

The mass spectrum of this compound contained a sharp cut-off at m/e=344, while the most intense peak observed in the molecular ion region was 339.

The products of this invention can be recovered from the reaction mixture by a number of methods well known in the art. After the reaction has been completed the insoluble alkali metal chloride is separated by filtration, centrifugation or any other convenient method following which the solvent employed is removed by evaporation. Recovery of the product from the solid residue thus obtained is accomplished by washing with petroleum ether, pentane, or hexane followed by drying or by recrystallization from carbon tetrachloride, chloroform, etc., or by vacuum sublimation.

What is claimed is:

1. A compound of the formula:

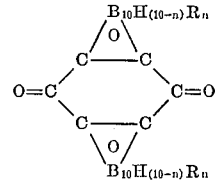

wherein $n$ is an integer of from 0 to 10 inclusive, R is selected from the group consisting of alkyl of from 1 to 5 carbon atoms and halogen selected from the group consisting of chlorine, bromine, iodine and fluorine, and with the proviso that when R is alkyl then $n$ is 1.

2. The compound of the formula:

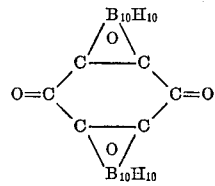

3. A method for the preparation of a compound of the formula

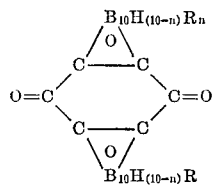

which comprises reacting phosgene with a compound of the formula:

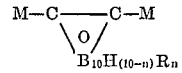

wherein M is an alkali metal selected from the group consisting of sodium, potassium and lithium and R is selected from the group consisting of alkyl of from 1 to 5 carbon atoms, and halogen selected from the group consisting of chlorine, bromine, iodine and fluorine, and with the proviso that when R is alkyl then $n$ is 1, at temperatures between about $-10°$ and about 80° C.

4. The method of claim 3 wherein the reaction is conducted in the presence of an inert organic solvent.

5. The method of claim 4 wherein the said solvent is toluene.

6. The method of claim 3 wherein the said compound is:

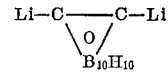

References Cited

Heying et al.: "J. Inorg. Chem.," vol. 2, p. 1098.

LEON ZITVER, *Primary Examiner.*

M. JACOB, *Assistant Examiner.*

UNITED STATES PATENT OFFICE
CERTIFICATE OF CORRECTION

Patent No. 3,395,182                                        July 30, 1968

Hansjuergen A. Schroeder

It is certified that error appears in the above identified patent and that said Letters Patent are hereby corrected as shown below:

Column 4, lines 27 to 34, the formula should appear as shown below:

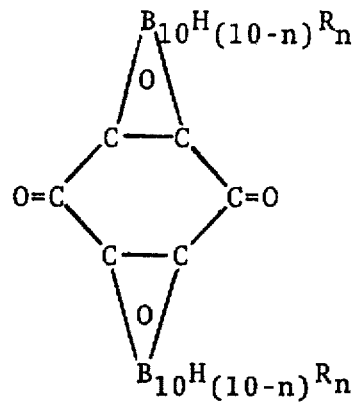

Signed and sealed this 13th day of January 1970.

(SEAL)
Attest:

EDWARD M. FLETCHER, JR.                          WILLIAM E. SCHUYLER, JR.
Attesting Officer                                           Commissioner of Patents